US011389870B2

(12) United States Patent
Coudert et al.

(10) Patent No.: US 11,389,870 B2
(45) Date of Patent: Jul. 19, 2022

(54) RING FOR A CONNECTION ELEMENT, A CONNECTION ELEMENT AND CORRESPONDING MANUFACTURING METHOD

(71) Applicant: SKF Aerospace France S.A.S, Montigny-le-Bretonneux (FR)

(72) Inventors: Jean-Baptiste Coudert, Granges les Beaumont (FR); Alexandre Mondelin, St-Marcel les Valence (FR); Arnaud Turmeau, Chabeuil (FR)

(73) Assignee: SKF AEROSPACE FRANCE S.A.S, Montigny-le-Bretonneux (FR)

( * ) Notice: Subject to any disclaimer, the term of this patent is extended or adjusted under 35 U.S.C. 154(b) by 0 days.

(21) Appl. No.: 17/120,564

(22) Filed: Dec. 14, 2020

(65) Prior Publication Data

US 2021/0213520 A1 Jul. 15, 2021

(30) Foreign Application Priority Data

Dec. 20, 2019 (FR) ...................................... 1915163

(51) Int. Cl.
*B22F 7/06* (2006.01)
*B23P 15/00* (2006.01)
(Continued)

(52) U.S. Cl.
CPC .............. *B22F 7/06* (2013.01); *B22D 17/007* (2013.01); *B22D 19/04* (2013.01); *B22D 19/16* (2013.01);
(Continued)

(58) Field of Classification Search
CPC ........ F16C 27/04; F16C 33/08; F16C 33/122; F16C 33/14; F16C 33/385; F16C 33/44;
(Continued)

(56) References Cited

U.S. PATENT DOCUMENTS 8,573,922 B2 * 11/2013 Milts ..................... F01D 21/045
415/9
8,747,054 B2 * 6/2014 Witlicki .................... F02C 7/06
415/119
(Continued)

FOREIGN PATENT DOCUMENTS

CN  109642677 A * 4/2019 ............. F01D 25/22
EP  2378142 A1 * 10/2011 .............. F16C 33/64
(Continued)

OTHER PUBLICATIONS

Preliminary Search Report from the French Patent Office dated Sep. 10, 2020 in related French application No. FR1915163, including Search Report and Written Opinion, and translation thereof.
(Continued)

*Primary Examiner* — Alan B Waits
(74) *Attorney, Agent, or Firm* — J-Tek Law PLLC; Scott T. Wakeman; Mark A. Ussai (57) ABSTRACT

A ring for a connection element includes a contact portion intended to cooperate with a contact surface of another ring and a fastening portion intended to be secured to a support. The contact portion is made of a first metallic material and the fastening portion is made of a second metallic material, the hardness of the first material being substantially greater than that of the second material, and the toughness of the second material being substantially greater than that of the first material, the contact portion and the fastening portion being of one piece construction.

9 Claims, 4 Drawing Sheets

(51) Int. Cl.
| | |
|---|---|
| *F16C 33/58* | (2006.01) |
| *F01D 25/16* | (2006.01) |
| *B22D 17/00* | (2006.01) |
| *B22D 19/04* | (2006.01) |
| *B22D 19/16* | (2006.01) |
| *F16C 33/12* | (2006.01) |
| *F16C 33/14* | (2006.01) |
| *F16C 33/36* | (2006.01) |
| *B22F 5/00* | (2006.01) |
| *F16C 27/04* | (2006.01) |
| *F16C 33/62* | (2006.01) |
| *F16C 33/64* | (2006.01) |

(52) U.S. Cl.
CPC ............ *B22F 5/009* (2013.01); *B23P 15/003* (2013.01); *F01D 25/164* (2013.01); *F16C 27/04* (2013.01); *F16C 33/122* (2013.01); *F16C 33/14* (2013.01); *F16C 33/36* (2013.01); *F16C 33/586* (2013.01); *F16C 33/62* (2013.01); *F16C 33/64* (2013.01); *F16C 2220/06* (2013.01); *F16C 2220/20* (2013.01); *F16C 2226/12* (2013.01); *F16C 2226/30* (2013.01); *F16C 2360/23* (2013.01)

(58) Field of Classification Search
CPC .... F16C 33/4629; F16C 33/56; F16C 33/585; F16C 33/62; F16C 33/64; F16C 35/045; F16C 35/067; F16C 2220/20; F16C 2220/06; F16C 2226/12; F16C 2226/30; F16C 33/36; F16C 33/586; F16C 2360/23; B22D 17/007; B22D 19/04; B22D 19/16; B23P 15/003; F01D 25/162; F01D 25/164; B22F 5/009; B22F 3/105; B22F 2998/00; B22F 7/06

USPC ....... 384/456, 492, 564, 471, 614–615, 625, 384/629, 910; 148/502, 549, 551

See application file for complete search history.

(56) References Cited

U.S. PATENT DOCUMENTS

| | | | |
|---|---|---|---|
| 8,998,501 B2* | 4/2015 | Dahlman | F16C 33/14 384/492 |
| 9,784,128 B2* | 10/2017 | Long | F01D 25/16 |
| 2011/0255819 A1* | 10/2011 | Vissers | F16C 33/60 384/564 |
| 2012/0055587 A1* | 3/2012 | Vissers | B22D 21/04 148/516 |
| 2016/0327098 A1* | 11/2016 | Long, Jr. | F01D 25/164 |

FOREIGN PATENT DOCUMENTS

| | | | | |
|---|---|---|---|---|
| EP | 2824340 A1 | 1/2015 | | |
| EP | 3170588 A1 | 5/2017 | | |
| GB | 2582427 A | 9/2020 | | |
| JP | S61206635 U | * 12/1986 | ............ F16C 23/084 |
| JP | 2008138704 A | 6/2008 | | |
| WO | 2008147284 A1 | 12/2008 | | |
| WO | WO-2010063299 A1 | * 6/2010 | ......... B60B 27/0084 |
| WO | WO-2015058759 A1 | * 4/2015 | ............ F16C 33/585 |

OTHER PUBLICATIONS

Search Report from the British Patent Office dated Apr. 19, 2021 in related application No. GB2019208.4.

* cited by examiner

RING FOR A CONNECTION ELEMENT, A CONNECTION ELEMENT AND CORRESPONDING MANUFACTURING METHOD

CROSS-REFERENCE

This application claims priority to French Patent Application No. 1915163, filed Dec. 20, 2019 the entire contents of which are fully incorporated herein by reference.

BACKGROUND OF THE INVENTION

The present invention relates to a connection element, to a ring intended to be incorporated into such a connection element, and to a method for manufacturing such a ring.

In the aeronautics industry, it is known to use rolling-element bearings for various applications, for example to implement a pivoting or rotating mechanical connection on an engine shaft of an aircraft. Generally, the rolling-element bearings used for such applications are very complex in shape.

Typically, a ring fitted to a rolling-element bearing of this kind comprises a contact portion that is intended to come into contact with the rolling elements of the bearing, and a fastening portion by which the ring can be fastened to a support or to the engine shaft. For example, certain rolling-element bearings that are intended to be incorporated into aircraft engines comprise an outer ring provided with a collar or squirrel-cage fastening portion.

Under these conditions, the ring must be capable of withstanding two different types of load: the contact portion must have sufficient hardness to create an effective raceway with regard to the rolling elements, and the fastening portion must have adequate structural fatigue strength to reliably fasten the ring to a support.

In order to accommodate these two types of loads, it has been proposed to choose a material that represents a good compromise between both types of loads. For example, the ring can be made of M50NiL steel and a raceway surface of the contact portion can be case-hardened.

However, a solution of this kind is not entirely satisfactory. First of all, the raceway surface made of case-hardened M50NiL has relatively low hardness, compared to other types of steel. Moreover, the step of case-hardening the raceway surface of the contact portion is costly. Furthermore, the mass of the fastening portion is relatively high compared to when more lightweight materials are used for equivalent fatigue performance.

SUMMARY OF THE INVENTION

The present invention aims to improve the properties of hardness and of structural fatigue strength of a contact portion and of a fastening portion of a ring of a connection assembly.

To achieve this goal, the present invention is a ring for a connection element comprising a contact portion that is intended to cooperate with a contact surface of another ring and a fastening portion that is intended to be secured to a support.

According to one general feature of this ring, the contact portion is made of a first metallic material, the fastening portion is made of a second metallic material, the hardness of the first material being substantially greater than that of the second material, and the toughness of the second material being substantially greater than that of the first material, the contact portion and the fastening portion being made in one piece (i.e., one-piece construction).

The hardness of the first material allows the contact portion to have better contact fatigue strength. Greater toughness makes it possible for the fastening portion to have good structural fatigue strength. Thus, the geometry of such a ring can be optimized at least partially due to these mechanical properties and may be more lightweight and more reliable than a ring made of a single material. Moreover, forming the ring in one piece makes it possible to avoid placing weld beads between the contact portion and the welded portion, which reduces the cost of manufacturing the ring and increases the reliability thereof.

In the present application, the expression "made in one piece" is to be understood as consisting of two portions forming a single part, in that the two portions are formed into a single bit during the same forming process, also referred to as one-piece construction. A part consisting of two portions made in one piece is therefore not an assembly of two parts formed separately then joined to one another during a subsequent assembly process.

Preferably, the contact portion and the fastening portion are made in one piece by sintering of metallic powders.

Preferably, the fastening portion includes a cage with a radial fastening rim and a substantially axial portion provided with a plurality of circumferentially distributed or spaced windows.

Another aspect proposes a connection element intended to be incorporated into an aircraft, comprising a first ring and a second ring, the first and second rings being mounted so as to be able to pivot or rotate with respect to one another, the first ring being a ring as defined above.

According to one embodiment, the contact portion comprises a contact surface, the connection element comprising at least one row of rolling elements interposed between the contact surface of the first ring and a contact surface of the second ring.

Yet another aspect of the present invention is a method for manufacturing a ring for a connection element as defined above, comprising, in this order: disposing a first metallic powder in an enclosure (e.g., a mold), disposing a second metallic powder in the enclosure, the second powder being different from the first powder, the method further comprising sintering of the powders stored in the enclosure so as to produce, in one piece, the contact portion and the fastening portion of the ring.

It is also possible to provide for the placing or disposing of a third metallic powder in the enclosure, the third powder being different from the first and second powders, the sintering of the powders stored in the enclosure being such as to produce an additional portion of the ring in one piece with the contact and fastening portions.

Such an embodiment makes it possible, inter alia, to create a transition portion between a contact portion and a fastening portion of the ring.

According to one embodiment, the method comprises, prior to disposing a first metallic powder, placing a spacer means in the enclosure, the powders stored in the enclosure being arranged around the spacer means.

Such an embodiment makes it possible to create a hollow preform so as to reduce the number of machining operations required to obtain the ring.

According to another embodiment, the sintering of the powders comprises spark plasma sintering.

According to one embodiment, the sintering of the powders comprises hot isostatic pressing.

It is also possible to provide, after sintering of the powders, a heat treatment step and/or a machining step.

BRIEF DESCRIPTION OF THE SEVERAL VIEWS OF THE DRAWING

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
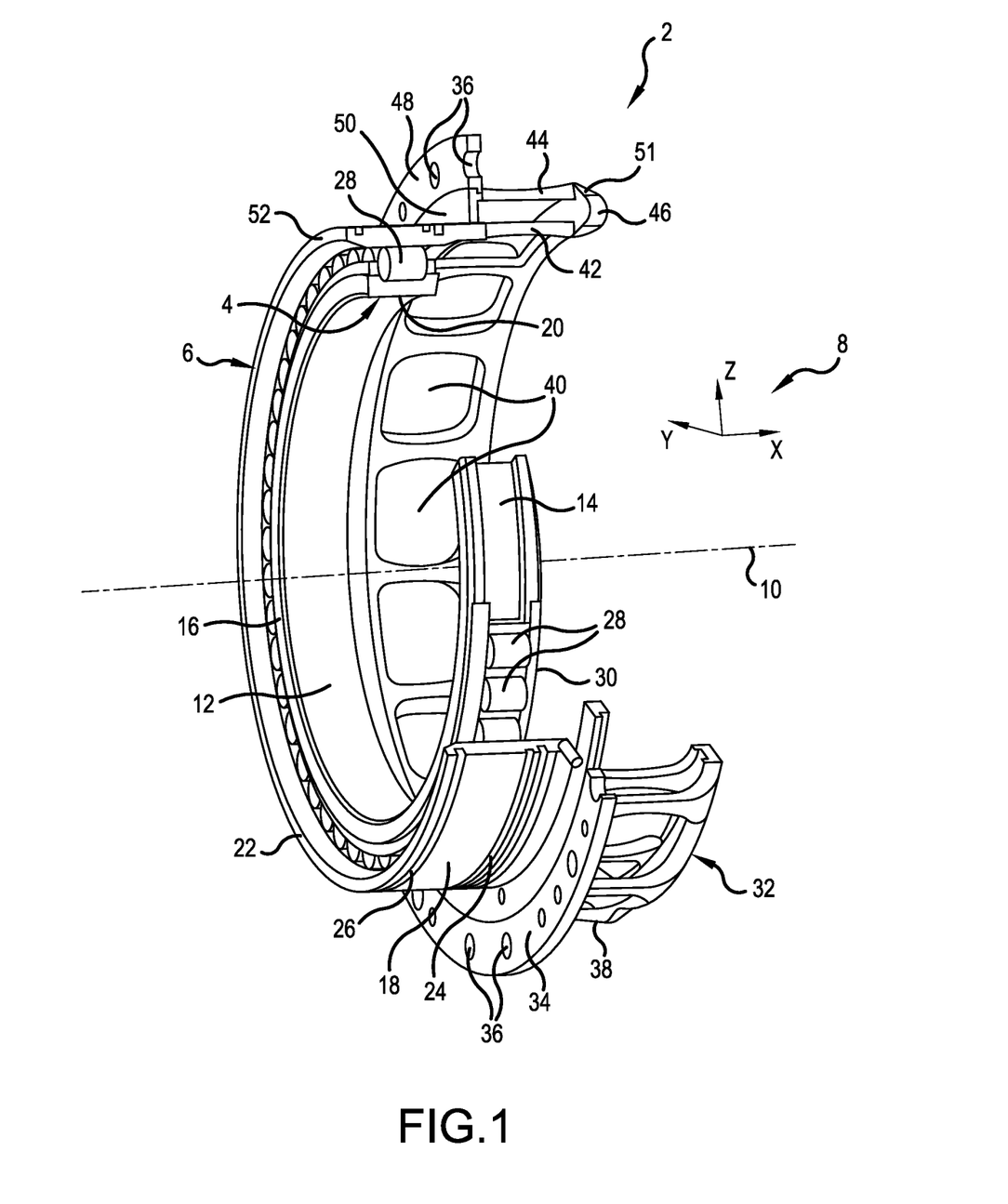
FIG. 1 represents, schematically, a connection element according to one aspect of the invention.

FIG. 1 shows a connection element 2. The connection element 2 is an element of a rolling-element bearing. The connection element 2 is intended to be incorporated into an aircraft. In particular, the connection element 2 is intended to guide a pivoting or rotational mechanical connection between an engine shaft and a support, or casing, of an aircraft engine (not shown). However, it is possible, without departing from the scope of the invention, to envisage a different application for the connection element 2.

The connection element 2 comprises an inner ring 4 and an outer ring 6. Preferably, the inner ring 4 is intended to be secured to an engine shaft (not shown) of the aircraft engine, and the outer ring 6 is intended to be secured to a support (not shown) of the aircraft engine.

An orthonormal vector base 8 that is as one with the outer ring 6 is defined. The base 8 consists of a vector X, a vector Y and a vector Z.

The shape of the rings 4 and 6 is that of a cylinder of revolution about a shared axis of revolution 10. The axis 10 is parallel to the vector X.

In the present application, except when otherwise indicated, the expression "cylindrical surface" refers to a surface that is created by a set of parallel straight lines resting on a closed plane curve.

In the present application, and unless otherwise stated, the terms "axial", "axially", "radial" and "radially" are to be understood as relating to the axis of revolution 10.

The inner ring 4 is provided with a substantially cylindrical inner surface 12, with a cylindrical outer surface 14 forming an inner raceway, and with side walls 16 connecting the inner surface 12 and the outer surface 14. Preferably, the inner ring 4 is made of steel, for example M50.

The outer ring 6 is provided with a substantially cylindrical outer surface 18, with a cylindrical inner surface 20 forming an outer raceway, and with side walls 22 connecting the outer surface 18 and the inner surface 20.

Preferably, the outer surface 18 comprises two circumferential grooves 24, 26 that are able to each receive a sealing segment (not shown). A fluid film is provided axially between the two segments accommodated in the grooves 24, 26, the film being confined radially between the outer surface 18 and a fixed support surface (not shown) so as to form a vibration attenuating means.

The connection element 2 preferably further comprises a plurality of rolling elements 28 that are accommodated between the raceways formed by the outer surface 14 and the inner surface 20. Due to the rolling elements 28 arranged in this manner, the inner ring 4 is capable of pivoting or rotating relative to the outer ring 6 about the axis 10. The rolling elements 28 are preferably held in the radial and tangential directions by a cage 30. In the example shown, the rolling elements 28 are cylindrical rollers whose axis is parallel to the axis 10. Alternatively, the rolling elements may be of another type, for example balls or conical rollers. Further, the connection element 2 may be formed without any rolling elements, such as for example, formed as plain bearing, without departing from the scope of the invention.

The outer ring 6 preferably includes a cage 32 of the "squirrel-cage" type extending axially from a side wall 22 of said outer ring 6. The squirrel cage 32 includes a fastening rim 34 extending substantially radially and intended to be securely fastened to a fixed support or framework (not shown), for example by means of threaded screws passing through through-holes 36 and accommodated in corresponding tapped openings of the support.

The squirrel cage 32 includes a substantially axial intermediate portion 38 with a plurality of windows 40 distributed or spaced circumferentially about the axis 10. The windows 40 function to provide the cage 32 with a degree of flexibility in order to withstand various vibration modes of the assembly. According to the embodiment shown, the intermediate portion 38 comprises two, first and second axial portions 42, 44, respectively, each one provided with windows 40. A first diameter of the first axial portion 44 is greater than a second diameter of the second axial portion 42. The two axial portions 42, 44 are connected by a foldover portion 46. The fastening rim 34 includes an outer portion 48 extending radially outwardly from a free end of the axial portion 44, and an inner portion 50 extending radially inwardly from said free end of the axial portion 44.

In accordance with the present invention, the outer ring 6 is made of two different materials. Specifically, the outer ring 6 includes a contact portion 52 that is configured to be in rolling contact with the rolling elements 28 and is formed of a first material. Thus, in this exemplary embodiment, the contact portion 52 cooperates with the outer surface 14 of the inner ring 4 by interposition of the rolling elements 28. As previously indicated, as a variant it is possible to provide a connection element 2 that has no rolling elements. In this case, the contact portion 52 cooperates directly with or contacts the outer surface 14 of the inner ring 4.

The outer ring 6 further includes the squirrel cage 32 that provides a fastening portion 51 and that is made of a second material different from the first material.

The contact portion 52 includes the outer surface 18 and inner surface 20, and the side walls 22. The contact portion 52 is made of a material chosen for contact fatigue properties and having a hardness substantially greater than the hardness of the second material. Thus, the contact portion 52 is made of a specific material in order to perform or provide the role of a direct rolling-element bearing support for the elements of the rolling-element bearing 28. Preferably, the first material is a steel chosen from among the following list: T15, AMS6560, T1 (Z80 WCrV18.4.1), M 62, M50, ASP2055.

The squirrel cage 32 is made of a material whose elasticity is substantially greater than that of the first material. Thus, the squirrel cage 32 is made of a specific material so as to be capable of withstanding forces and vibrations. In the example shown, the second material is chosen from among the following list: titanium alloy, aluminium alloy, steel, for example a low-carbon or medium-carbon steel, 32CVD13, INCONEL718.

Figure 2:
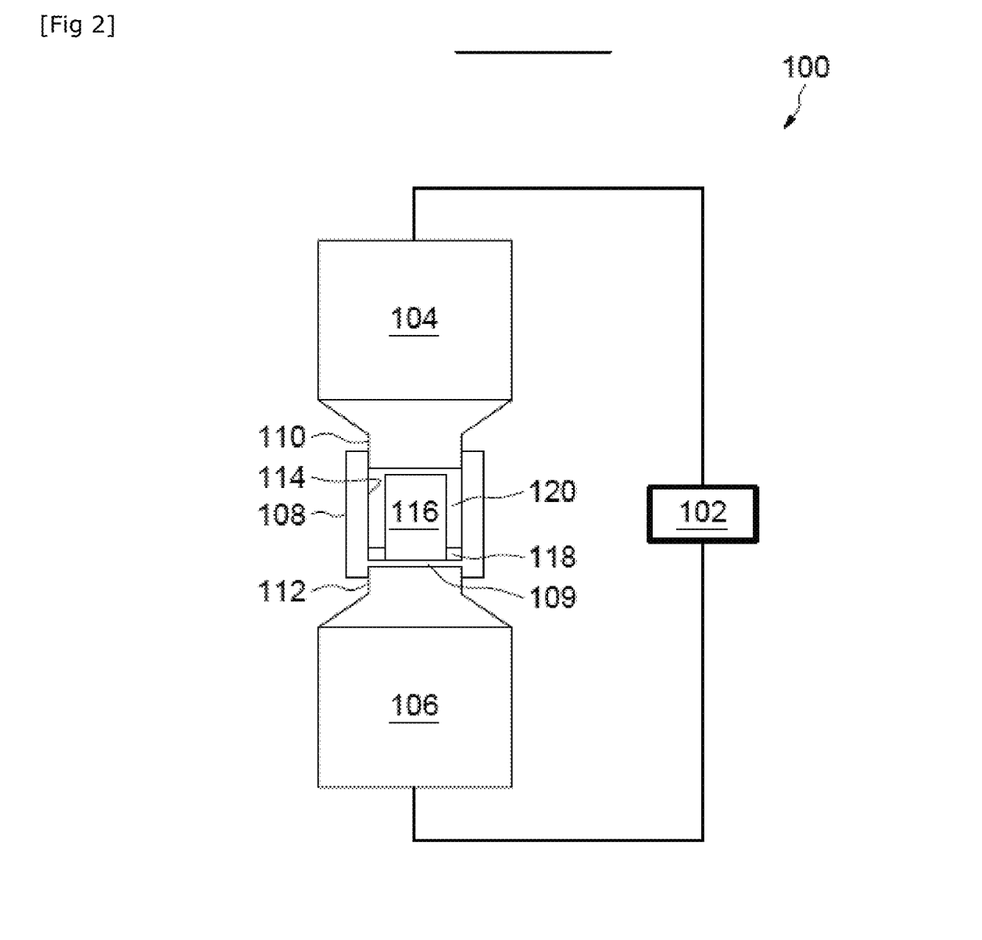
FIG. 2 represents, schematically, a device for manufacturing such a ring by spark plasma sintering.

FIG. 2 schematically shows a manufacturing device 100. The device 100 is intended for the manufacture of a ring such as the outer ring 6 of the connection element 2.

The device 100 comprises a pulse generator 102, an upper die 104 and a lower die 106. The generator 102 is capable of generating an electric current and is electrically connected to the dies 104 and 106. The dies 104 and 106 are made of an electrically conductive material. For example, the dies 104 and 106 may be made of graphite. Alternatively, the dies 104 and 106 may accommodate an electrically conductive element extending over the entire height of the dies 104 and 106.

The device 100 further comprises a hollow cylinder 108. The shape of the cylinder 108 is revolved about a vertical axis (not shown). The hollow cylinder 108 includes a cylindrical inner surface, the shape of which matches a cylindrical surface of the lower end 110 of the upper die 104, and a cylindrical surface of the upper end 112 of the lower die 106. Due to these matching shapes, the interior of the cylinder 108, together with the ends of the dies 104 and 106, delimits an enclosure or mold 114. The cylinder 108 includes a bottom wall 109 by means of which the cylinder 108 can be held vertically relative to the die 106, and by means of which the cylinder 108 can be moved when it is filled with powder.

The device 100 comprises a cylinder 116. The shape of the cylinder 116 is revolved about a vertical axis (not shown). The cylinder 116 is arranged in the enclosure 114 in such a way that its axis of revolution substantially coincides with the axis of revolution of the cylinder 108. The cylinder 116 is shorter than the vertical distance between the dies 104 and 106, such that the dies can be brought together when compacting the powders.

Figure 3:
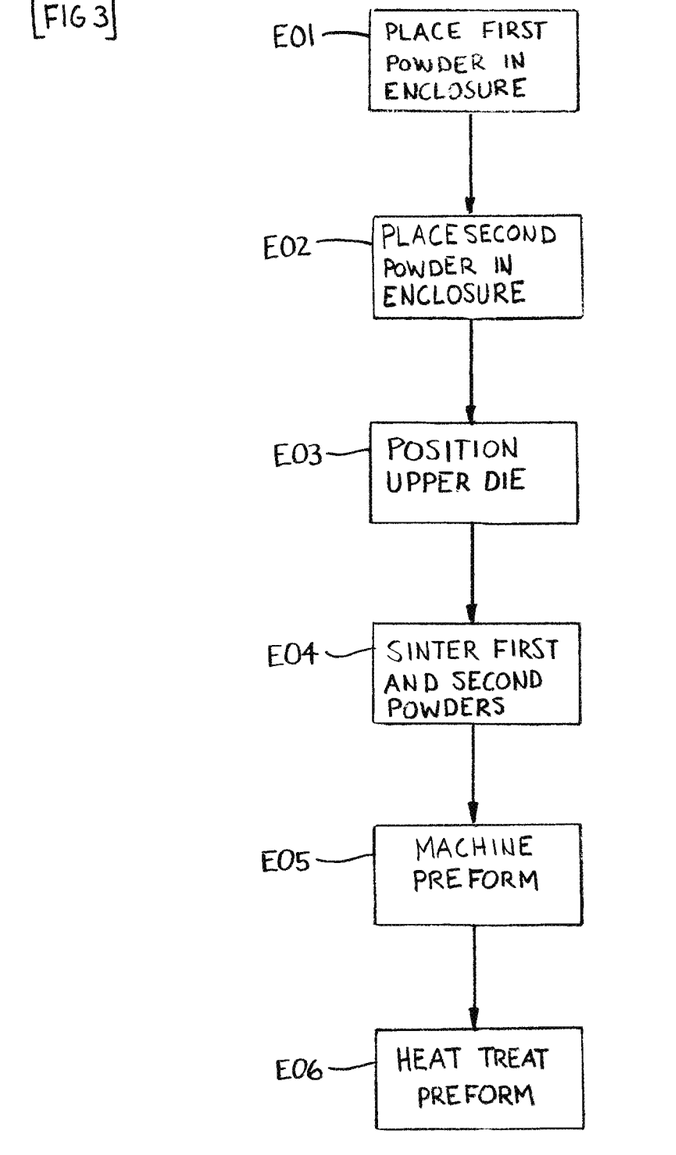
FIG. 3 represents, schematically, a method for manufacturing a ring of the connection element of FIG. 1.

With reference to FIG. 3, there follows a description of a method for the manufacture of the outer ring 6, implemented using the manufacturing device 100 of FIG. 2. Although the method shown in FIG. 3 serves to create the outer ring 6, the method may be used to create another ring, for example the inner ring 4, without departing from the scope of the invention.

In the initial state of the method, the cylinders 108 and 116 are arranged above the upper end of the lower die 106. Thus, the enclosure 114 is delimited by the cylinder 108 and the lower die 106 and is accessible from above.

The method comprises a first step E01 of placing or disposing a first metallic powder 118 (see FIG. 2) in the enclosure 114. The first powder 118 is intended for the creation of the contact portion 52 of the outer ring 6. For that reason, the first powder 118 is suitable for forming the first material that constitutes the contact portion 52.

The method comprises a second step E02 of placing/disposing a second metallic powder 120 (see FIG. 2) in the enclosure 114. The second powder 120 is intended for forming the squirrel cage 32 of the outer ring 6. For that reason, the second powder 120 is intended for forming the second material that constitutes the squirrel cage 32.

The first powder 118 and the second powder 120 are different. More particularly, the first powder 118 is intended to form a steel that is harder than the material formed by the second powder 120, and the second powder 120 is intended to form a metal having greater structural fatigue strength than the material formed by the first powder 118.

Owing to the order of steps E01 and E02, the first powder 118 is interposed vertically between the lower die 106 and the second powder 120.

The method comprises a third step E03 of positioning the upper die 104. Step E03 involves placing the lower end of the die 104 inside the cylinder 108 and in vertical abutment against the cylinder 116. Thus, the second powder 120 is interposed vertically between the upper die 104 and the first powder 118.

The method comprises a fourth step E04 of sintering the powders 118 and 120. In this case, step E04 comprises spark plasma sintering of the powders 118 and 120. Spark plasma sintering is also known by the acronym SPS.

Figure 4:
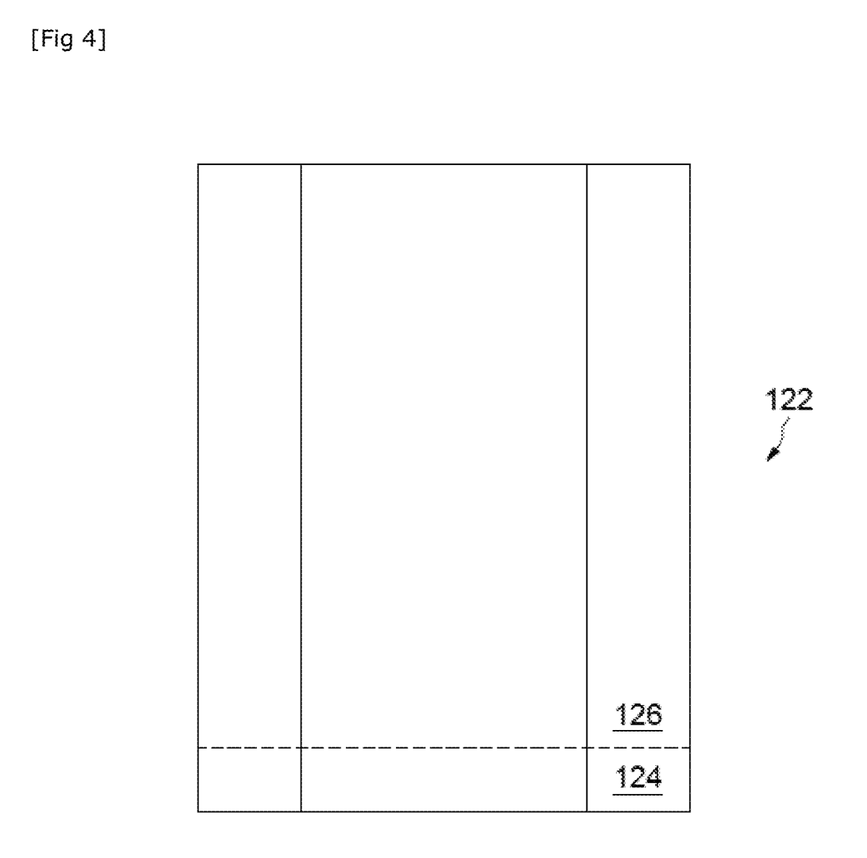
FIG. 4 represents, in section, a preform obtained from the method of FIG. 3.

During step E04, the pulse generator 102 emits a plurality of current pulses. The pulses are transmitted to the powders 118 and 120 by means of the dies 104 and 106. Joule heating causes the temperature of the powders 118 and 120 to rise significantly until they fuse. The result of step E04 is a preform 122 comprising a lower portion 124 corresponding to the powder 118 after sintering and an upper portion 126 corresponding to the powder 120 after sintering. The preform 122 is illustrated in FIG. 4. Hence, the portion 124 is harder than the portion 126, and the portion 126 has greater structural fatigue strength than the portion 124. Due to the spark plasma sintering of the powders 118 and 120 contained in the same enclosure 114, the portions 124 and 126 are in one piece (i.e., one-piece construction) and form a single part, without it being necessary to carry out an assembly process.

The method comprises a step E05 of machining the preform 122. Step E05 involves carrying out machining operations in order that the preform 122 takes on the shape of the outer ring 6. More particularly, during step E05, the lower portion 124 is machined such that it takes on the shape of the contact portion 52, and the upper portion 126 is machined such that it takes on the shape of the squirrel cage 32.

The method comprises a step E06 of heat-treating the preform 122. Step E06 involves implementing at least one heat treatment chosen from among quenching, tempering and annealing.

The result of the process is the ring 6 as illustrated in FIG. 1. The ring 6 is created with a contact portion 52 made of a material that is sufficiently hard to be capable of creating an effective raceway for the rolling elements, and a fastening portion 51 that is lightweight and has suitable structural fatigue strength. The contact portion 52 and the fastening portion 51 are formed in one piece and do not require the implementation of a welding operation. The consequence of this is a reduction in the cost of manufacturing the ring 6 and an increase in the reliability thereof.

Alternatively, the powders 118 and 120 may be sintered by hot isostatic pressing, instead of by spark plasma sintering. Hot isostatic pressing is also known by the acronym HIP.

Similarly, it is possible to add at least one metallic powder (i.e., a third metallic powder) in addition to the first and second powders 118 and 120. For example, a metallic powder may be added vertically interposed between the first and second powders 118 and 120. The metallic powder interposed in this manner can form a transition portion between portions 124 and 126.

Moreover, steps E05 and E06 may be swapped without departing from the scope of the invention. Similarly, it is possible to carry out some of the machining operations before the heat-treatment operations, and other machining operations after the heat-treatment operations, or even to carry out some of the heat-treatment operations before the machining operations, and other heat-treatment operations after the machining operations.

Using the cylinder 116 is advantageous for at least the fact that it makes it possible to reduce the number of machining operations that must be implemented during step E05. It is also possible to envisage that, in the initial state of the method, the cylinder 116 is not arranged in the enclosure 114. In this case, the preform 122 obtained at the end of step E04 will not be hollow as illustrated in FIG. 4.

It is also possible to envisage repeating multiple times a phase consisting of steps E01 and E02. As a result, the enclosure 114 contains multiple portions, vertically interposed and each comprising the thickness of the first powder 118 and the thickness of the second powder 120. In this case, at the end of step E04, the preform is a bar comprising, interposed in this order, a portion made of a first material, a portion made of a second material, a portion made of the first material, a portion made of the second material, and so on. In this case, the method comprises, between steps E04 and E05, an additional step involving cutting, for example by sawing, a part of the bar consisting of a portion made of the first material and a portion made of the second material, so as to obtain a new preform that is identical to the preform 122.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments and may be varied within the scope of the following claims.

We claim:

1. A ring for a connection element, the ring comprising:
a contact portion configured to cooperate with a contact surface of another ring and formed of a first metallic material; and
a fastening portion configured to be secured to a support and formed of a second metallic material, the hardness of the first material being substantially greater than that of the second material, and the toughness of the second material being substantially greater than that of the first material, the contact portion and the fastening portion being made in one piece;
wherein the fastening portion includes a cage having a radial fastening rim and a substantially axial portion with a plurality of circumferentially spaced windows, the axial portion including a first axial portion with a first diameter and a second axial portion with a second diameter, the first diameter being greater than the second diameter, and a foldover portion connecting the first and second axial portions.

2. The ring according to claim 1, wherein the contact portion and the fastening portion are made in one piece by sintering of metallic powders.

3. The ring according to claim 1 wherein the radial fastening rim of the cage is attached to the contact portion.

4. The ring according to claim 1, wherein:
the first material is one of T15, AMS6560, T1 (Z80 WCrV18.4.1), M 6, M50 and ASP2055; and
the second material is one of titanium alloy, aluminum alloy, steel 32 CVD13 and INCONEL718.

5. A method of manufacturing a ring for a connection element, the ring including a contact portion configured to cooperate with a contact surface of another ring and formed of a first metallic material and a fastening portion configured to be secured to a support and formed of a second metallic material, the hardness of the first material being substantially greater than that of the second material, and the toughness of the second material being substantially greater than that of the first material, the method comprising the steps of:
disposing a first metallic powder in an enclosure;
disposing a second metallic powder in the enclosure, the second powder being different from the first powder;
sintering of the powders disposed within the enclosure so as to produce, in one piece, the contact portion and the fastening portion of the ring; and
disposing a third metallic powder in the enclosure, the third powder being different from the first and second powders, the sintering of the first, second and third powders in the enclosure producing an additional portion of the ring in one piece with the contact portion and the fastening portion.

6. The method according to claim 5, further comprising the step of placing a spacer means in the enclosure prior to disposing the first metallic powder such that the first and second powders disposed within the enclosure are arranged around the spacer means.

7. The method according to claim 5, wherein the step of sintering the first and second powders includes at least one of spark plasma sintering and hot isostatic pressing.

8. The method according to claim 5, further comprising at least one of the steps of:
heat treating a preform after sintering of the first and second powders; and
machining a preform after sintering of the first and second powders.

9. A method of manufacturing a ring for a connection element, the ring including a contact portion configured to cooperate with a contact surface of another ring and formed of a first metallic material and a fastening portion configured to be secured to a support and formed of a second metallic material, the hardness of the first material being substantially greater than that of the second material, and the toughness of the second material being substantially greater than that of the first material, the method comprising the steps of:
disposing a first metallic powder in an enclosure;
disposing a second metallic powder in the enclosure, the second powder being different from the first powder;

sintering of the powders disposed within the enclosure so as to produce, in one piece, the contact portion and the fastening portion of the ring; and placing a spacer means in the enclosure prior to disposing the first metallic powder such that the first and second powders disposed within the enclosure are arranged around the spacer means.

* * * * *